US007248864B1

(12) United States Patent
Robertson et al.

(10) Patent No.: US 7,248,864 B1
(45) Date of Patent: Jul. 24, 2007

(54) SYSTEM AND METHOD OF MANAGING INCOMING CALLS ON A MOBILE DEVICE HAVING AN EARPLUG

(75) Inventors: Ryan Robertson, Seattle, WA (US); Stephane Maes, Mountain View, CA (US); Benoit Vialle, Evanston, IL (US); Tim Twerdahl, Los Altos, CA (US)

(73) Assignee: PalmSource, Inc., Sunnyvale, CA (US)

( * ) Notice: Subject to any disclaimer, the term of this patent is extended or adjusted under 35 U.S.C. 154(b) by 104 days.

(21) Appl. No.: 09/677,526

(22) Filed: Sep. 29, 2000

(51) Int. Cl.
*H04M 3/42* (2006.01)

(52) U.S. Cl. .................. 455/417; 455/140; 455/414.1; 455/556.1; 455/556.2; 455/567; 455/575.2; 455/575.3; 455/575.4

(58) Field of Classification Search ............... 455/140, 455/142, 403, 421, 556, 415, 412, 413, 401, 455/412.1, 412.2, 414.1, 417, 445, 550.1, 455/556.1, 556.2, 567, 575.2, 575.3, 575.4
See application file for complete search history.

(56) References Cited

U.S. PATENT DOCUMENTS

| | | | | |
|---|---|---|---|---|
| 4,972,457 A | * | 11/1990 | O'Sullivan ................. 455/556 |
| 5,450,613 A | * | 9/1995 | Takahara et al. ............ 455/517 |
| 5,526,411 A | * | 6/1996 | Krieter .................. 379/110.01 |
| 5,584,054 A | * | 12/1996 | Tyneski et al. ............. 455/566 |
| 5,606,594 A | * | 2/1997 | Register et al. ............. 455/550 |
| 5,613,222 A | * | 3/1997 | Guenther ................ 455/575.2 |
| 5,675,641 A | * | 10/1997 | Watanabe et al. ....... 379/388.02 |
| 5,719,936 A | * | 2/1998 | Hillenmayer ............... 379/447 |
| 5,796,806 A | * | 8/1998 | Birckbichler .............. 379/88.2 |
| 5,797,089 A | * | 8/1998 | Nguyen ..................... 455/403 |
| 5,933,783 A | * | 8/1999 | Kawakami et al. ......... 455/550 |
| 5,983,073 A | * | 11/1999 | Ditzik ...................... 455/11.1 |
| 6,026,152 A | * | 2/2000 | Cannon et al. ......... 379/142.06 |
| 6,091,947 A | * | 7/2000 | Sumner ..................... 455/413 |
| 6,114,625 A | * | 9/2000 | Hughes et al. ............. 174/52.1 |
| 6,131,046 A | * | 10/2000 | Sano et al. ................. 455/566 |
| 6,161,134 A | * | 12/2000 | Wang et al. ................ 709/220 |
| 6,215,993 B1 | * | 4/2001 | Ulveland ................... 455/415 |
| 6,233,464 B1 | * | 5/2001 | Chmaytelli ................. 455/556 |
| 6,240,302 B1 | * | 5/2001 | Harrison .................... 455/556 |
| 6,253,075 B1 | * | 6/2001 | Beghtol et al. ............. 455/415 |
| 6,330,436 B1 | * | 12/2001 | Zidel ........................ 455/412 |
| 6,334,054 B1 | * | 12/2001 | Link et al. ................. 455/413 |
| 6,343,120 B1 | * | 1/2002 | Rhodes ................. 379/142.01 |

(Continued)

*Primary Examiner*—William Trost
*Assistant Examiner*—James D. Ewart
(74) *Attorney, Agent, or Firm*—Berry & Associates P.C.

(57) ABSTRACT

A system and method is described for managing a phone call to a phone device of a personal digital assistant, the phone call being transmitted from a device in a mobile phone network. In one example, the method involves determining a status of a radio switch of the personal digital assistant. The personal digital assistant determines a status of the network coverage of the phone device. In other words, the personal digital assistant determines the relative strength of the phone call signal that is transmitted to the phone device from the mobile phone network. If the radio switch is turned on and the network coverage is adequate, the phone device receives the phone call. A user of the personal digital assistant preferably has an option of answering or not answering the phone call. If the phone call is not answered, the phone call is preferably redirected to a voicemail application.

16 Claims, 6 Drawing Sheets

U.S. PATENT DOCUMENTS

| | | | |
|---|---|---|---|
| 6,397,078 B1* | 5/2002 | Kim | 455/556 |
| 6,400,814 B1* | 6/2002 | Adams | 379/142.01 |
| 6,434,403 B1* | 8/2002 | Ausems et al. | 455/556 |
| 6,574,319 B2* | 6/2003 | Latter et al. | 379/142.07 |
| 6,597,901 B1* | 7/2003 | Malthouse | 455/349 |
| 6,625,425 B1* | 9/2003 | Hughes et al. | 455/90.3 |
| 6,895,237 B1* | 5/2005 | Scott | 455/414.1 |
| 6,941,131 B2* | 9/2005 | Roderique | 455/417 |
| 2001/0012348 A1* | 8/2001 | Latter et al. | 379/142.06 |

* cited by examiner

SYSTEM AND METHOD OF MANAGING INCOMING CALLS ON A MOBILE DEVICE HAVING AN EARPLUG

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention generally relates to telecommunications and, more particularly, to providing phone applications in a portable computer system.

2. Discussion of Background

Personal computer systems have become common tools in modern society. To organize their lives, many personal computer users use personal information management applications such as an address book and a daily organizer on their personal computers. Although such applications have proven useful for personal information management, their utility is limited by the fact that the person must be sitting at their personal computer system to access the information.

To remedy this limitation, many palmtop computers, electronic organizers and other handheld devices, commonly known as personal digital assistants ("PDA's") have been introduced. A PDA is a computer that is small enough to be held in the hand of a user and runs personal information management applications such as an address book, a daily organizer, and electronic notepads. These applications make people's lives easier.

The most popular brand of PDA is the Palm™ (not shown). However, the Palm™ is much more than a simple PDA. A Palm™ is small, slim, device, about the size of your wallet, can hold 6000 addresses, 5 years of appointments, 1500 to-do items, 1500 memos, 200 e-mail messages, and can run many different software applications.

The front panel of the Palm™ is a large LCD screen, which is touch-sensitive and allows a user to enter and manipulate data. By using a stylus to interact with a touch-sensitive screen, a user may easily navigate through a host of various software applications. A stylus is used to interact with information on a screen in much the same way as a mouse on a desktop personal computer.

Many PDA's offer Internet connectivity, as well as a vast array of hardware and software choices. PDA's have evolved into a new kind of handheld device that people use to instantly manage all kinds of information, from email, to medical data, to stock reports. Unfortunately, to date, PDA's have had only modest success in the marketplace, due to their high price tags, as well as their useful although limited applications.

In addition to being somewhat limited, many PDA applications have generally not been available in the PDA's counterpart—the mobile phone. Mobile phone manufacturers have taken the approach of trying to integrate PDA functionality into their mobile phones. This approach has several disadvantages. To fulfill their primary function of efficiently making phone calls, mobile phones are geared toward a different feature set from PDA's. For example, as one of the design aims for mobile phones is ever-smaller size, Internet access is compromised. Mobile phones are an unattractive Internet access option because the screen on a mobile phone is typically much smaller than that of a PDA. A mobile phone can typically display only a small fraction of the amount information that a PDA can display.

Generally, many applications that are user-friendly on a PDA would be cumbersome in a mobile phone environment. Additional examples of such applications include inputting an address list and displaying a detailed record of calls. A mobile phone is therefore inherently unsuitable for navigating through even the simplest of PDA applications.

PDA's and mobile phones have been manufactured to meet different design aims. PDA's are primarily designed to provide personal information management in a small, portable device. Mobile phones are primarily designed for efficiently making phone calls while on the go. A mobile phone environment is generally not geared for running PDA software applications, including anything more than the lowest level of graphics.

SUMMARY OF THE INVENTION

It has been recognized that what is needed is an efficient system for integrating mobile phone functionality into a palmtop environment. The present invention fills these needs by providing a system and method for managing a phone call to a phone device of a personal digital assistant (PDA). It should be appreciated that the present invention can be implemented in numerous ways, including as a process, an apparatus, a system, a device or a method. Several inventive embodiments of the present invention are described below.

In one embodiment, the method comprises determining a status of a radio switch of the personal digital assistant. A status of network coverage of the phone device of the personal digital assistant is also determined.

In another embodiment, the method further comprises determining a status of an earplug device. If the earplug device is plugged in, the earplug device is electrically connected to the personal digital assistant and is configured to emit sound waves related to signals received from the phone device of the personal digital assistant.

In still another embodiment, the method further includes receiving caller data of the phone call, wherein the caller data includes information on a phone number associated with the phone call, and information on a name associated with the phone number. An incoming message is displayed, wherein the incoming message includes information related to the caller data.

Advantageously, the present invention provides a more convenient and efficient system for combining mobile phone functionality with PDA functionality. A user may utilize traditional mobile phone applications without having to deal with mobile phone inconveniences. The present invention provides an environment for applications that require more robust computer systems and graphics capabilities than a typical mobile phone provides. Moreover, the present invention provides a system that not only fulfills these requirements, but also has palm-size portability. Further, other embodiments, disclosed in detail below, illustrate how the present invention provides mobile phone software applications that are ideally used within a PDA of the present invention.

The invention encompasses other embodiments of a method, an apparatus, and a computer-readable medium, which are configured as set forth above and with other features and alternatives.

BRIEF DESCRIPTION OF THE DRAWINGS

The present invention will be readily understood by the following detailed description in conjunction with the accompanying drawings. To facilitate this description, like reference numerals designate like structural elements.

DESCRIPTION OF THE PREFERRED EMBODIMENTS

An invention for a system and method for managing a phone call to a phone device of a personal digital assistant (PDA) is disclosed. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

General Overview

Figure 1:
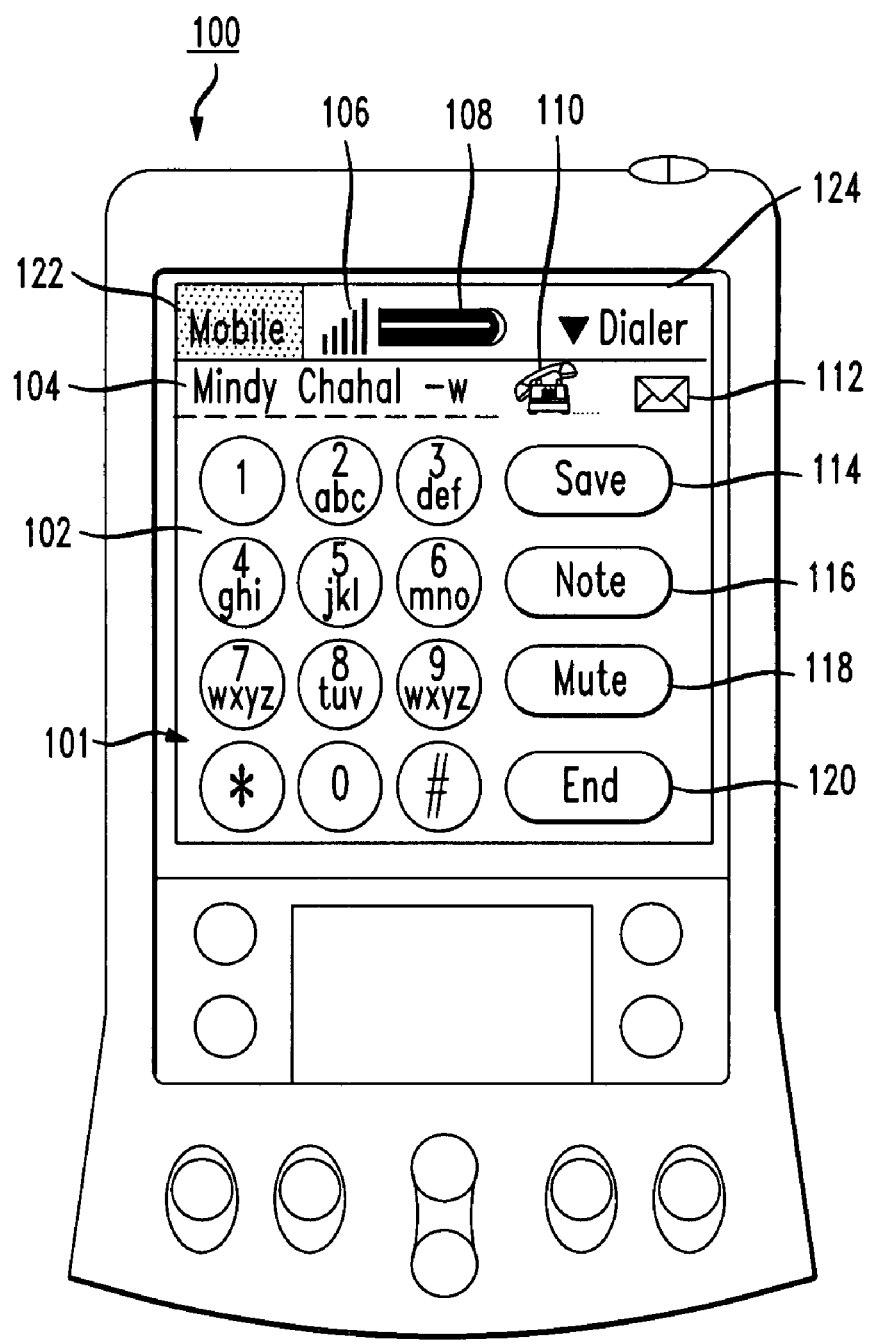
FIG. 1 shows a call device of a phone device in a personal digital assistant (PDA), in accordance with one embodiment of the present invention.

FIG. 1 shows a personal digital assistant (PDA) 100, in accordance with one embodiment of the present invention. Examples of a PDA include palm style computers, such as a Palm III™, Palm V™, or Palm VII™, organizers, manufactured by 3Com Corporation. Other embodiments of the invention include Windows CE™ handheld computers, other handheld computers, and other personal digital assistants.

The Palm™ and its operating environment are used herein to illustrate various aspects of the present invention. However, it should be understood that the present invention may be practiced on other devices, including other Palm™ models, PDA's, computer devices, PC's, notebooks, etc.

A PDA 100 is preferably a combination of a processor and memory, having a portable energy source, and being housed in a manner to be carried with one hand. A PDA 100 combines computing, telephone/fax, and networking features, and can function as a cellular phone, fax sender, and personal organizer. A PDA 100 is preferably pen-based, using a stylus rather than a keyboard for input. This use of a stylus means that a PDA 100 preferably incorporates handwriting recognition features. In another embodiment, a PDA 100 can react to voice input by using voice recognition technologies.

A call device 101 is shown active on the screen PDA 100. A phone device in the PDA 100 runs the call device 101. A phone device in a PDA 100 is preferably software, hardware, or combination thereof that allows a user to perform functions of a mobile phone. Such mobile phone functions may include, for example, dialing phone numbers, placing phone calls, receiving phone calls, and receiving voicemail. When the PDA 100 is performing functions of a mobile phone, a mobile phone indicator 122 is preferably located near the top portion of the screen of the PDA 100.

When the phone device is showing the call device 101 on the screen of PDA 100, the PDA 100 preferably indicates by a phone status icon 124 that the call device 101 is in dialer mode. The call device 101 preferably includes a dialer pad 102, which allows a user to input numbers, letters, punctuation, or other symbols into the call device 101. Numbers may be inputted, for example, to dial a phone number or to load a phone number into a memory of the PDA 100. Letters may be inputted, for example, to load a person's name, address, or other information into memory of the PDA 100.

The call device 101 of FIG. 1 is shown while the call device 101 is in standby mode. The power of the PDA 101 is on, and the call device 101 is activated. However, the PDA 100 is neither receiving nor making a phone call. A name field 104 is preferably located near the top portion of the call device 101. The name field 104 may have information that identifies, for example, an incoming caller, an outgoing call recipient, the owner of the PDA 100, or a carrier of the mobile phone network in which the PDA 100 operates. In FIG. 1, "Swisscom" is the identification in the name field 104. In this example, Swisscom is the carrier of the mobile phone network in which the PDA 100 is operating. The carrier appears in the name field 104 while the phone is in standby mode. A dialer status icon 110 is preferably included near the top portion of the call device 101 to indicate to the user that the call device 101 is in standby mode. A ringer icon 111 indicates the style of ring that is set. In this example, the ringer icon 111 indicates the ringer of the phone device is set to vibrate mode. Other ringer icons may indicate audible mode or silent mode.

The embodiment of FIG. 1 shows other features that may be initiated in the call device 101. A user may initiate these other applications by pressing a button icon, such as a talk button 114, a speed button 116, a clear button 118, or an end button 120. User activation of the Save button 114 saves the phone number associated with a call the user is currently engaged to the address book. User activation of the note button 116 activates an in-call note taking service. User activation of the mute button 118 mutes the caller at the other end of the line (other caller). This muting which keeps the other caller from hearing any conversation initiated at the users side of the conversation. User activation of the end button 120 terminates the call that the user is currently participating.

If a message has been recorded in the voicemail application, a voicemail indicator 112 preferably appears near the top portion of the screen of the PDA 100. In FIG. 1, the voicemail indicator 112 is an envelope icon. The presence of the voicemail indicator 112 is preferably controlled by a short message service (SMS), a voicemail application, or a combination of both. SMS is a telecommunications tool that supports the transmission of short text messages in a telecommunications network. A voicemail application is a telecommunications tool used to record voice messages of an incoming caller when the phone call is not received or answered by the PDA 100.

The voicemail indicator 112 preferably disappears if there are no unheard messages. Whether the envelope remains on the screen after a message is partly heard (or not deleted in the voicemail application) is dependent on the particular settings of the network in which the voicemail application or SMS operates.

Additionally, when the PDA 100 is running the call device 101, the PDA 100 preferably has at the top of the screen a signal strength indicator 106 and a battery charge indicator 108. The signal strength indicator 106 indicates a relative quality and strength of a signal that may be transmitted in a mobile phone network in which the phone device is located. The battery charge indicator 108 shows a relative amount of energy remaining in the battery of the PDA 100.

Structural Overview

Figure 2:
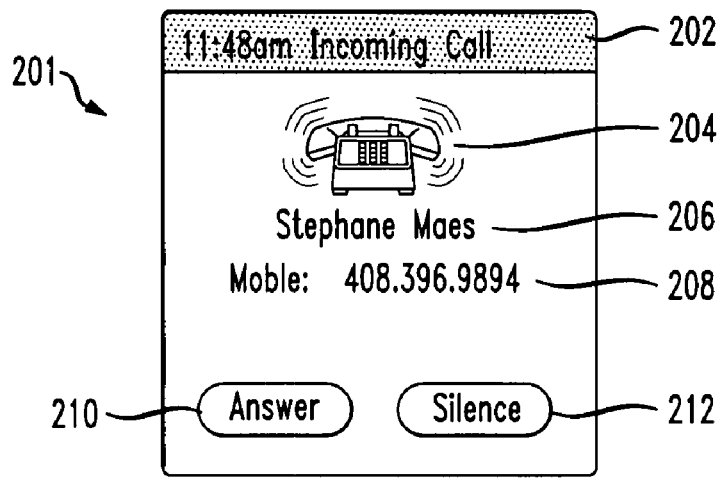
FIG. 2 shows an incoming message having caller data for a phone call, in accordance with one embodiment of the present invention.

FIG. 2 shows a PDA 100 that displays an incoming message 201 having caller data for a phone call, in accordance with one embodiment of the present invention. The incoming message 201 is displayed on the screen when PDA 100 receives an incoming call signal from a telephone network. The caller data preferably includes a phone number 208 and a name 206 associated with the phone number 208. The phone device will attempt to identify the phone number 208 and the name 206 as the phone call is being transmitted to the phone device. The PDA 100 receives the transmission of the phone call from a mobile phone network. The phone number is associated with a phone device that is connected to the mobile phone network and that originated the phone call.

A name 206 will preferably be either identifiable or unidentifiable. Identifiable means that the PDA 100 is able match the name with information that is stored in memory. Likewise, a phone number 208 will be either identifiable or unidentifiable.

In the example of FIG. 2, the name 206 and the phone number 208 are each identifiable. Here, the phone number 208 is shown to be "408.396.9894." The name 206 is shown to be "Stephanie Maes." In an alternative embodiment, the name 206 is shown with additional caller information, such as "w" to indicate work, "h" to indicate home, or "m" to indicate mobile phone. For example, the name 206 may be displayed as "Stephanie Maes—w", indicating that the PDA 100 is receiving a phone call from Stephanie Maes at her work.

The incoming message 201 preferably includes a status bar 202. In FIG. 2, the status bar 202 indicates that a phone call is being transmitted to the phone device, and that the present time is "11:48." Additionally, a ringing indicator 204 preferably appears indicating that a phone call is being transmitted to the phone device.

In a preferred embodiment, the incoming message 201 appears before a user responds to the phone call. A user may answer the phone call by using a stylus to press an answer button 210 on the display device of the PDA 100. Activation of the answer button 210, initiates procedures for answering, which involves the PDA 100 receiving and transmitting signals related to the phone call.

Alternatively, the user may silence the ringer by using a stylus to press a silence button 212. Activation of the silence button 212 preferably sends a silence signal to silence the ringer and to redirect the phone call to a voicemail application. However, even if the ringer is preset to silent mode, the silence button 212 can be used to redirect the phone call to a voicemail application.

The voicemail application is preferably not stored in the memory of the PDA itself. The portion of the voicemail application that actually stores messages or sends pages is located at another location in the mobile phone network. The phone device is capable of connecting to the network to receive voicemail messages, pages, or other signals sent from the voicemail application.

Figure 3:
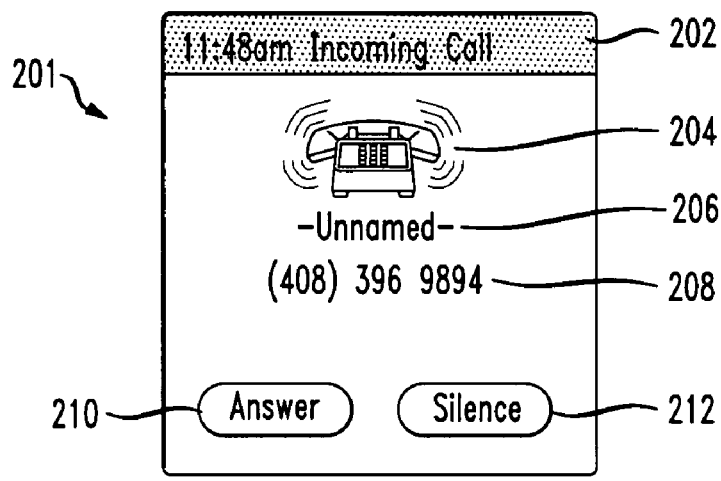
FIG. 3 shows an incoming message having caller data that is partially identifiable, in accordance with one embodiment of the present invention.

FIG. 3 shows an incoming message 201 having caller data that is partially identifiable, in accordance with one embodiment of the present invention. The phone number 208 here is identified as "(408) 396 9894." The name 206, however, is unidentifiable. Accordingly, the name 206 here is "Unnamed" to indicate that the PDA has not identified a name for the phone number 208.

Figure 4:
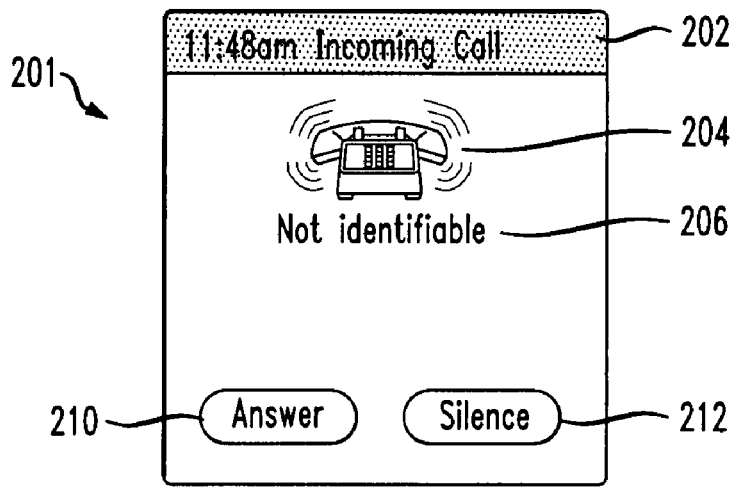
FIG. 4 shows an incoming message having caller data that is totally unidentifiable, in accordance with one embodiment of the present invention.

FIG. 4 shows an incoming message 201 having caller data that is totally unidentifiable, in accordance with one embodiment of the present invention. Accordingly, a "Not identifiable" message appears to indicate that neither a phone number nor a name has been identified for the phone call. However, regardless of any identification, the user is preferably given an option of answering or silencing the phone call, as discussed above with reference to FIG. 2.

Figure 5:
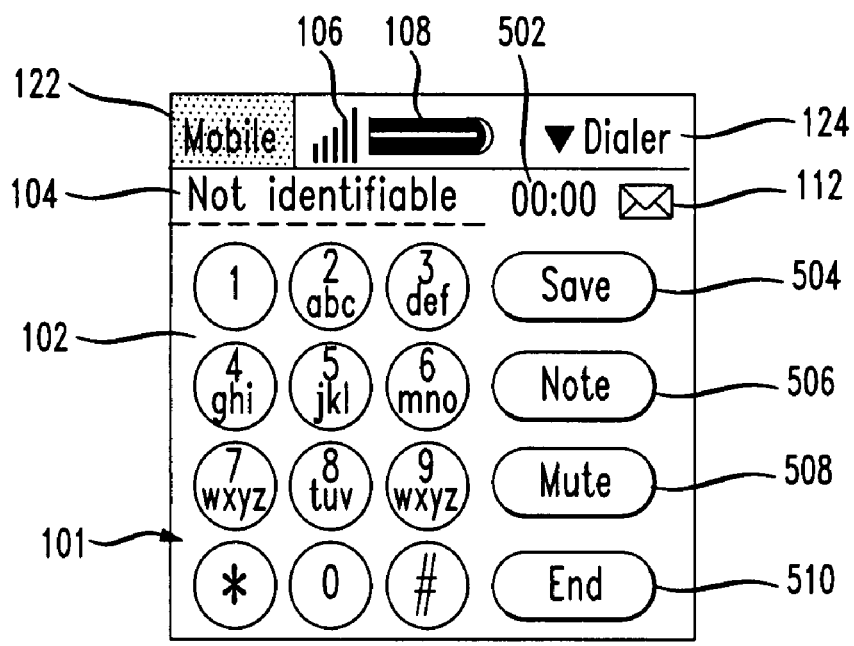
FIG. 5 shows the call device as a phone call is being answered, in accordance with one embodiment of the present invention.

FIG. 5 shows the call device 101 as a phone call is being answered, in accordance with one embodiment of the present invention. In this embodiment, the phone call is unidentifiable. Accordingly, "Not identifiable" appears in the name field 104 of the call device 101 to indicate the caller data does not contain an identifiable phone number or name. Preferably, the call device 101 begins a timer 502 when the phone call is answered. The timer 502 clocks the period of time the phone call is being answered.

Other features of the call device 101 include, for example, a save button 504, a note button 506, a mute button 508, and an end button 510. User activation of the Save button 504 saves the phone number associated with a call the user is currently engaged to the address book. User activation of the note button 506 activates an in-call note taking service. User activation of the mute button 508 mutes the caller at the other end of the line (other caller). This muting which keeps the other caller from hearing any conversation initiated at the users side of the conversation. User activation of the end button 510 terminates the call that the user is currently participating.

Figure 6:
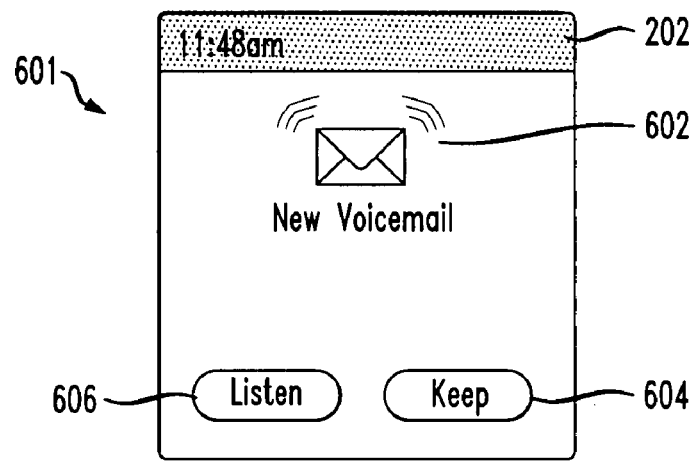
FIG. 6 shows a voicemail notification of a phone device in a PDA, in accordance with one embodiment of the present invention.

FIG. 6 shows a voicemail notification 601 of a phone device in a PDA, in accordance with one embodiment of the present invention. The voicemail notification 601 appears on the display to notify the user that a new unheard voicemail message has been received by the voicemail application. The voice mail preferably includes a new voicemail icon 602, which includes the words "New Voicemail."

The voicemail notification 601 also preferably includes a keep button 604 and a listen button 606. A user may activate a button by using a stylus to tap the appropriate region on the display device having a tap recognizer. A tap recognizer is hardware, software, or combination thereof connected to a touch-sensitive portion of the display device 132. A tap recognizer is configured to initiate a predetermined routine when a user taps the soft button 126. For example, activation of the keep button 604 sends the phone device back to the previous activity that was in use before the voicemail notification 601 appeared. Activation of the listen button 606 initiates an outgoing phone call to the voicemail application.

Process Overview

Figure 7:
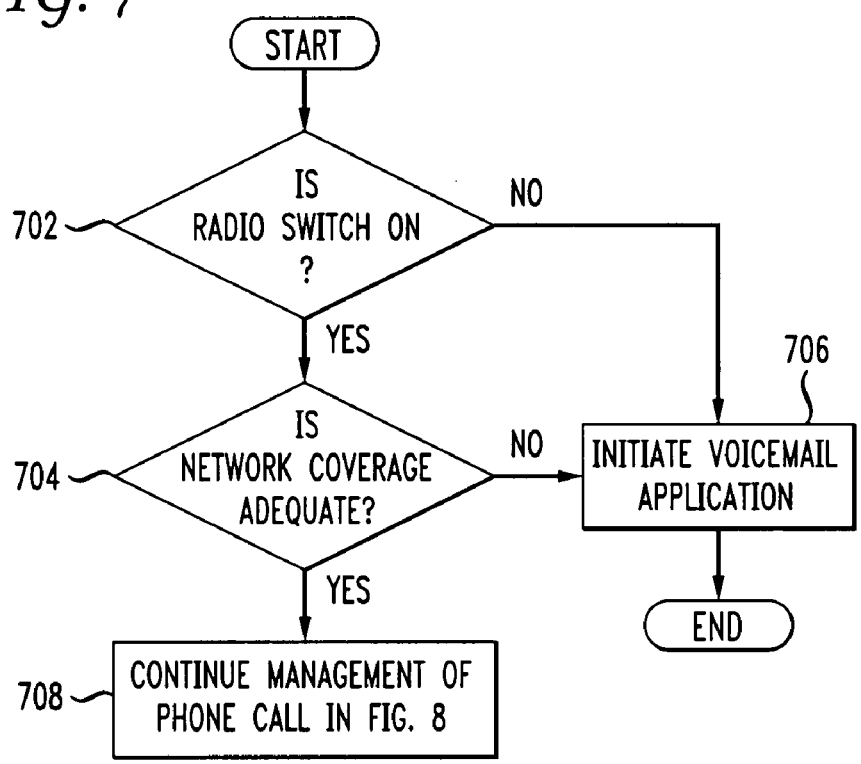
FIG. 7 is a flow chart of a method of managing a phone call, in accordance with one embodiment of the present invention.

FIG. 7 is a flow chart of a method of managing a phone call, in accordance with one embodiment of the present invention. For purposes of the following discussion, the phone call is being transmitted from a device in a mobile phone network to the phone device of a personal digital assistant, such as PDA 100.

The method starts in decision operation 702, where it is determined if a radio switch of the PDA 100 is turned on. This determination is preferably made by a radio switch detector configured to determine a status of the radio switch. The purpose of the radio switch itself is to turn on (or off) the radio capability of the PDA 100. A radio switch, for example, can be used in the PDA 100 to complete a circuit that powers an antenna that allows the PDA 100 to transmit radio waves. Preferably, the antenna is electrically connected to a receiver that allows the PDA to receive a phone call transmitted from a device in a mobile phone network. Thus, in a preferred embodiment, the PDA 100 communicates with a mobile phone network by way of electromagnetic waves at a radio frequency.

If the radio switch is turned off, then a voicemail application is initiated in step 706. On the other hand, if the radio switch is turned on, then it is determined in operation 704 whether the PDA 100 is within adequate network coverage. This determination is preferably made by a network coverage detector. A network coverage detector is hardware, software, or combination thereof in the PDA 100, configured to determine the status of network coverage of the PDA 100. Network coverage is adequate where the signal strength of the phone call is sufficient for the phone device to maintain a connection with the mobile phone network. If network coverage is inadequate, then the voicemail application is initiated in step 706.

Accordingly, if the radio switch is turned off or if the network coverage is inadequate, signals from a mobile phone network that carry phone calls are never received by the PDA 100. In other words, the phone device does not interpret the phone call signals. The phone call is diverted to the voicemail application, where the incoming caller may leave a message or initiate a page. However, if the radio switch is on and if network coverage is adequate, then the method moves to step 708 where management of the phone call continues.

Figure 8:
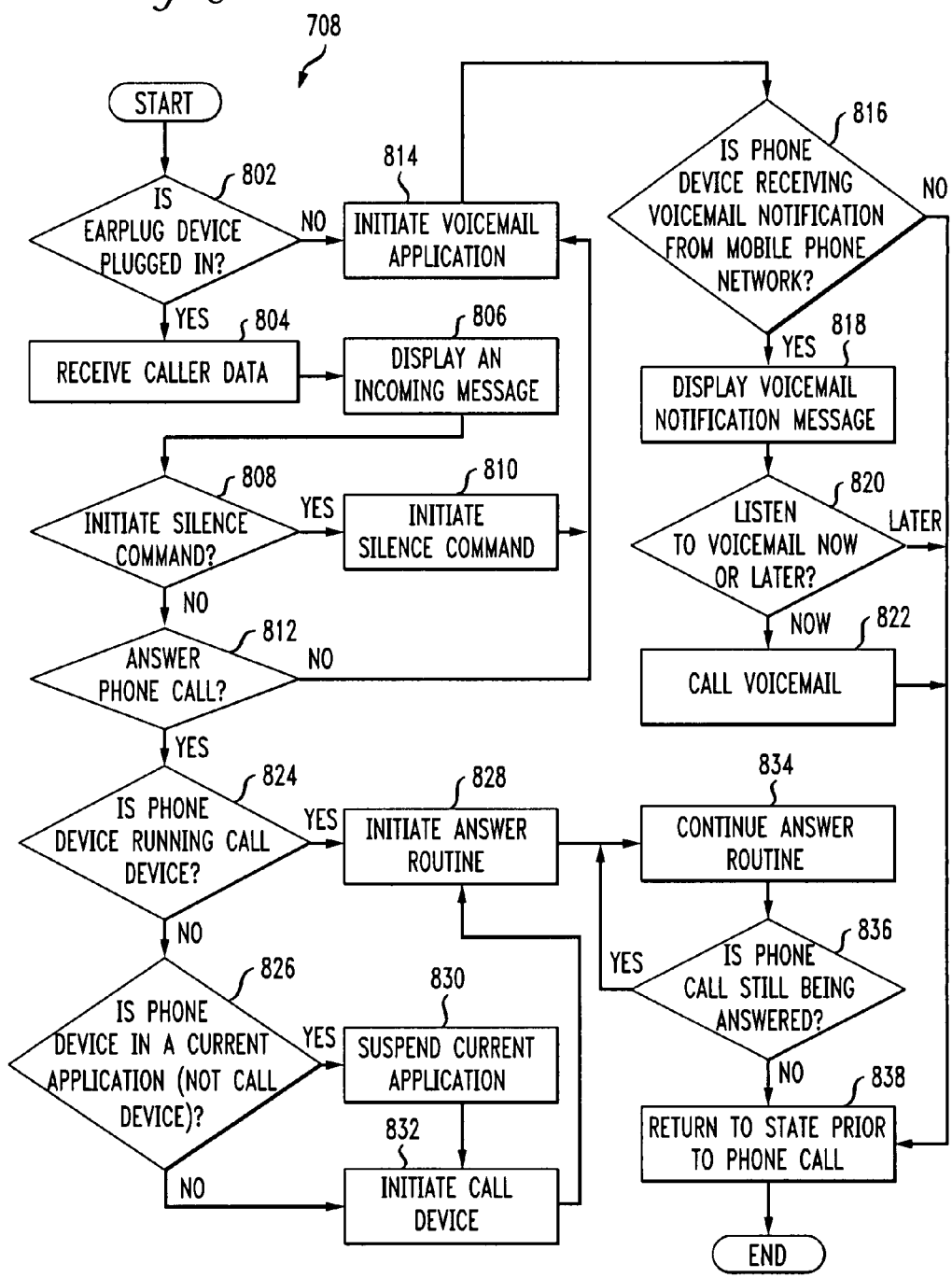
FIG. 8 is a flowchart for managing a phone call that is properly received by the phone device, in accordance with one embodiment of the present invention.

FIG. 8 is a flowchart for managing a phone call that is properly received by the phone device, in accordance with one embodiment of the present invention. For purposes of the following discussion, a phone call may be properly received if the radio switch is on and the network coverage is adequate to transmit a phone call to the phone device. The method starts in decision operation 802 where it is determined, by an earplug device detector, if an earplug device is plugged into the PDA 100. An earplug device detector is hardware, software, or combination thereof in the PDA 100, configured to electronically sense if an earplug is plugged into the PDA 100.

An earplug device is a type of a speaker device that allows a user to hear the phone call. A retractable earplug is plugged into the PDA 100 if the earplug is electrically connected to the PDA 100 and is configured to emit sound waves related to signals received from the PDA. In an alternative embodiment, the earplug device is fixed in the PDA housing, which is preferably made of a durable plastic material. The present invention, however, is not so limited to these specific embodiments.

If no earplug device is plugged into the PDA 100, the PDA 100 initiates a voicemail application in step 814. In the voicemail application, for example, an incoming caller leaves a message or initiates a page to the phone device, as discussed above with reference to FIG. 6.

If, however, an earplug device is plugged into the PDA 100, the phone device receives caller data related to the phone call in step 804. For example, the PDA 100 receives the phone call from a mobile phone network. Included with the phone call is identification data, or caller data. As discussed above with reference to FIG. 2, caller data preferably includes a phone number 208 and a name 206 associated with the phone number 208. The phone device, in step 806, then displays an incoming message 201 on the screen of the PDA 100. This incoming message 201 will include the caller data.

Along with the incoming message 201 comes decision operation 808, where the phone device determines whether to initiate a silence routine. For example, the phone device is ringing and displaying the incoming message 201, but the user does not want to answer the phone call. The user preferably has at least an option of silencing the phone call. The user may use a stylus to press the silence button 212 and, thereby, redirect the phone call to the voicemail application, as discussed above with reference to FIG. 2. If the phone device determines that the silence routine is to be initiated, the silence routine is initiated in step 810. The voicemail application is then initiated in step 814.

If it is determined in operation 808 that the silence routine is not to be initiated, it is then determined in operation 812 whether the phone call is to be answered. For example, the user may decide neither to answer the phone call nor to silence the phone call. The voicemail application is then initiated in step 814.

Alternatively, the phone device may determine that the phone call is to be answered. For example, a user may use a stylus to press the answer button 212 and, thereby, redirect the phone call to the voicemail application, as discussed above with reference to FIG. 2. If the phone call is to be answered, is it quickly determined if the phone device is running the call device 101, an application discussed above with reference to FIG. 1. In a preferred embodiment, the call device 101 should be active while the phone call is being answered.

If the call device 101 is active, the phone device initiates the answer routine in step 828. For example, the user presses the answer button 212. The phone device quickly determines that the call device 101 is in fact active. In other words, the dialer pad 102 and other features of the call device 101 are available on the graphical user interface of the PDA 100. The answer routine is then initiated, in which the timer 502 starts and the PDA sends and receives signals in the mobile phone network, as discussed above with reference to FIG. 5.

If, however, the call device 101 is not running, the PDA 100 determines if the phone device is already in another current application, other then the call device 101. If the phone device is in another current application, the PDA 100 suspends this current application in step 630. In step 832, the PDA 100 then initiates (or boots) the call device 101. On the other hand, if the phone device is not in another current application, the PDA initiates (or boots) the call device 101 in step 832. The answer routine is then initiated in step 828.

Once the answer routine is initiated in step 828, the PDA continues the answer routine. For example, the timer continues to clock the period of time the phone call is being answered. The user, meanwhile, is likely to be having a conversation with a person on the other end of the phone call connection. During the phone call, it is continuously determined, in operation 836, whether the phone call is still being answered. For example, the user either hangs up or continues the telephone conversation. If the phone call is still being answered, the answer routine is continued in step 834.

However, if the phone call is no longer being answered, the PDA returns to the state that the PDA was in prior to receiving the phone call in step 838. For example, the user hangs up the phone, and the PDA returns to the application that was running on the PDA before the user answered the phone.

Returning to the discussion of step 814, upon initiation of the voicemail application, the PDA 100 performs any number of applications that may be so directed by the user. Such an application may be, for example, running a calendar program, inputting a to do list, or placing the PDA 100 into standby mode. Meanwhile, it is determined in decision operation 816 if the phone device is receiving voicemail notification from a mobile phone network. For example, the PDA 100 is receptive to signals that may be sent from a mobile phone network indicating that a new voicemail message has been received. If there is no such signal, the PDA moves on to step 838 to return to the state of the PDA prior to the phone call.

On the other hand, if the phone device is receiving voicemail notification from a mobile phone network, a voicemail notification message is displayed on the screen of the PDA 100. For example, a voicemail notification 601 appears on the display to notify the user that a new unheard voicemail message has been received by the voicemail application, as discussed above with reference to FIG. 6.

The PDA 100, in decision operation 820, then determines if the voicemail is to be listened to now or later. If the voicemail is to be listened to later, the PDA returns to the state of the PDA prior to the phone call in step 838. If the voicemail is to be listened to now, the phone device initiates procedures to call the voicemail in step 822.

In the embodiment of FIG. 8, the PDA eventually returns to the state of the PDA prior to the phone call. However, in an alternative embodiment the PDA never returns to the state of the PDA prior to the phone call. The PDA may, for example, be diverted directly to an Internet application, go directly into standby mode, or simply lose power. In a preferred embodiment, however, step 838 effectively represents when the process is done. In short, the foregoing discussion with references to FIG. 7 and FIG. 8 includes a method of managing a phone call to a phone device of a personal digital assistant.

Hardware Overview

Figure 9:
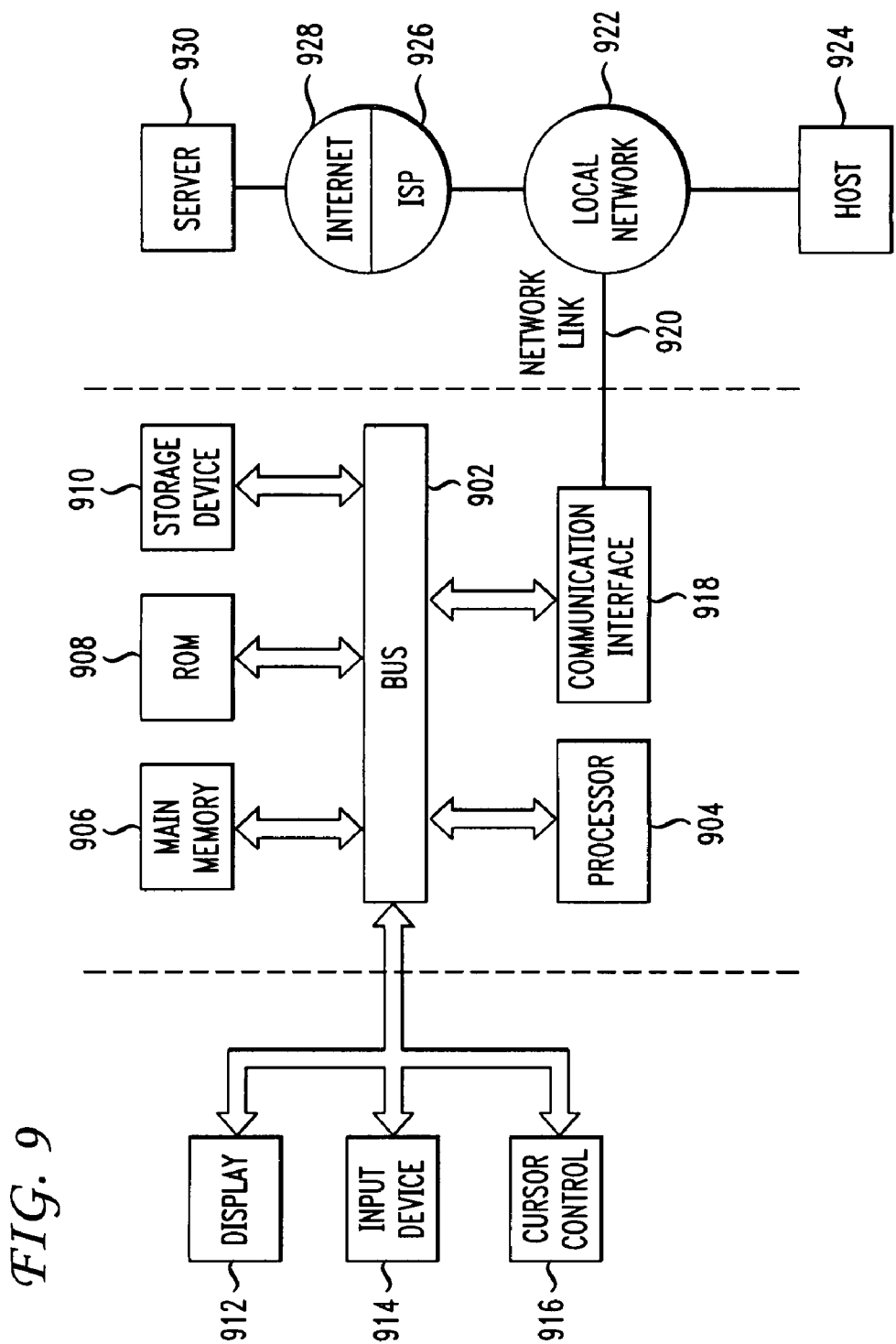
FIG. 9 is a block diagram that illustrates a computer system upon which an embodiment of the invention may be implemented.

FIG. 9 is a block diagram that illustrates a computer system 900 upon which an embodiment of the invention may be implemented. The preferred embodiment is implemented using one or more computer programs running on a portable computer, such as PDA 100. Accordingly, in this embodiment, the computer system 900 is PDA 100.

The configuration shown in FIG. 9 is for exemplary purposes for discussing the present invention. Many different combinations of processing units, programs, memory units, and telephone devices (modules) will be apparent to those skilled in the art to perform similar operations as required by the present invention.

Computer system 900 includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a liquid crystal display (LCD), for displaying information to a computer user. An input device 914 is a touch-sensitive LCD that interprets input by sensing contact on the LCD. The input device 914 is coupled to bus 902 for communicating information and command selections to processor 904. Another type of input device 914 includes alphanumeric and other keys, and is coupled to bus 902 for communicating information and command selections to processor 904. Still another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for providing mobile phone applications in a PDA 100. According to one embodiment of the invention, mobile phone applications are provided by computer system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 904 for execution. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, a DVD, any other optical medium, punchcards, papertape, any other physical medium with patterns of holes, a RAM, a DRAM, a VRAM, a ROM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector coupled to bus 902 can receive the data carried in the infra-red signal and place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. As an example, the communication interface 918 is connected to an antenna and performs wireless communications to a network, such as Internet ISP 926 or local network 922. In another example, the communication interface 918 connects to a mobile phone network to complete calls initiated by the process of the present invention. In still another example, communication interface 918 is an integrated services digital network (ISDN) card or a modem to provide a data communication connection to a corresponding type of telephone line. In yet another example, communication interface 918 is a local area network (LAN) card that provides a data communication connection to a compatible LAN. In any such implementation, communication interface 918 sends and receives electrical, electromagnetic or optical signals that carry digital data streams representing various types of information.

In a preferred embodiment, the communication interface 918 is a phone device that communicates with a network carrier to make phone calls, including any of satellite, PCS, cellular, radio, landline, plain old telephone system (POTS), mobile, and other communication modes. Incoming call indications (such as incoming call, caller ID, call status, etc.) are sent from the phone device to the call device 101 running on the processing unit via the bus 902. Although a bus is shown, any mode of data communication between the various modules may be provided. The call device 101 initiates calls and directs call operations by sending commands to the phone device (via the system bus, for example).

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution. In this manner, computer system 900 may obtain application code in the form of a carrier wave.

Scope

In this disclosure, including in the claims, certain process steps are set forth in a particular order, and alphabetic and alphanumeric labels may be used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of managing a phone call to a mobile wireless device, the method comprising:
   determining a status of an earplug device associated with the mobile wireless device; and
   managing an incoming phone call to the mobile wireless device based on the status of the earplug device by:
      receiving the incoming phone call only when the earplug device is plugged into the mobile wireless device; and
      diverting the incoming phone call to a voicemail application when the earplug device is not plugged into the mobile wireless device.

2. The method of claim 1, further comprising:
   receiving a voicemail notification; and
   presenting a voicemail notification message.

3. The method of claim 1, further comprising:
   receiving caller data of the incoming phone call, wherein the caller data includes information on a phone number associated with the incoming phone call, and information on a name associated with the incoming phone number; and
   displaying an incoming message, wherein the incoming message includes information related to the caller data.

4. The method of claim 3, wherein the information on the phone number is identifiable or unidentifiable, and wherein the information on the name is identifiable or unidentifiable.

5. The method of claim 1, further comprising:
   suspending a current application other than a call device, wherein the call device is configured to be active if the incoming phone call is being answered; and
   initiating the call device.

6. The method of claim 1, further comprising:
   silencing a ringer of the wireless handheld phone device and sending the incoming phone call to the voicemail application when the user performs an action to initiate a silence routine after being alerted to the incoming phone call.

7. The method of claim 1, further comprising:
   determining a status of a radio switch; and
   determining a status of a network coverage of the mobile wireless device, wherein the managing of the incoming phone call to the mobile wireless device further based on the status of the radio switch and the status of the network coverage.

8. A wireless handheld phone device comprising:
a receiver configured to receive a phone call; and
an earplug device status determiner configured to determine a status of an earplug device with respect to the wireless handheld phone device; wherein:
the receiver is configured to receive the phone call only when the earplug device status determiner determines that the earplug device is plugged into the wireless handheld phone device, and
when the earplug device status determiner determines that the earplug device is not plugged in, the wireless handheld phone device is further configured to divert the phone call to a voicemail application.

9. The wireless handheld phone device of claim 8, further comprising:
a display device; and
a tap recognizer connected to the display device, wherein the tap recognizer is configured to initiate a voicemail application.

10. The wireless handheld phone device of claim 8, further comprising:
a display device; and
a tap recognizer connected to the display device, wherein the tap recognizer is configured to answer the phone call and to initiate a call application.

11. A computer-readable medium storing a program having more instructions for managing an incoming phone call to a wireless handheld phone device, the instructions comprising:
determining a status of an earplug device with respect to the wireless handheld phone device;
receiving the incoming phone call only when the earplug device is plugged into the wireless handheld phone device; and
diverting the incoming phone call when the earplug device is determined to not be plugged in.

12. The computer-readable medium as recited in claim 11, the instructions further comprising:
determining a status of a radio switch; and
determining a status of a network coverage of the wireless handheld phone device, wherein
if the radio switch is on, the wireless handheld phone device is capable of receiving the phone call, and wherein if the network coverage is adequate, the signal strength of the phone call is sufficient for the wireless handheld phone device to maintain a connection with a mobile phone network.

13. The computer-readable medium as recited in claim 11, wherein the instructions further comprise:
receiving a voicemail notification; and
presenting a voicemail notification message.

14. The computer-readable medium as recited in claim 11, wherein the instructions further comprise:
receiving caller data of the phone call, wherein the caller data includes information on a phone number associated with the incoming phone call, and information on a name associated with the phone number; and
presenting an incoming message, wherein the incoming message includes information related to the caller data.

15. The computer-readable medium as recited in claim 14, wherein the information on the phone number is identifiable or unidentifiable, and wherein the information on the name is identifiable or unidentifiable.

16. The computer-readable medium as recited in claim 11, wherein the instructions further comprise:
suspending a current application other than a call device, wherein the call device is configured to be active if the phone call is being answered; and
initiating the call device.

* * * * *